United States Patent [19]

Okuda

[11] Patent Number: 5,880,214
[45] Date of Patent: *Mar. 9, 1999

[54] EMULSION INKS FOR STENCIL PRINTING

[75] Inventor: Sadanao Okuda, Tokyo, Japan

[73] Assignee: Riso Kagaku Corporation, Tokyo, Japan

[*] Notice: The term of this patent shall not extend beyond the expiration date of Pat. No. 5,575,839.

[21] Appl. No.: 938,043

[22] Filed: Sep. 26, 1997

Related U.S. Application Data

[63] Continuation of Ser. No. 651,125, May 21, 1996, abandoned, which is a continuation of Ser. No. 188,061, Jan. 26, 1994, abandoned.

[30] Foreign Application Priority Data

Jan. 28, 1993 [JP] Japan ...................... 5-12674

[51] Int. Cl.⁶ .................................. C08F 2/32
[52] U.S. Cl. ................ 524/801; 524/524; 523/337; 260/DIG. 38; 106/31.13; 106/31.25; 106/31.26
[58] Field of Search .................... 524/524, 801; 523/337; 260/DIG. 38; 106/31.13, 31.25, 31.26

[56] References Cited

U.S. PATENT DOCUMENTS

| | | | |
|---|---|---|---|
| 4,981,517 | 1/1991 | De Santo, Jr. et al. | 106/28 |
| 5,010,125 | 4/1991 | Kruse et al. | 524/308 |
| 5,104,448 | 4/1992 | Kruse | 106/22 |
| 5,112,398 | 5/1992 | Kruse | 106/20 |
| 5,114,479 | 5/1992 | Keaveney et al. | 106/30 |
| 5,149,367 | 9/1992 | Reuter et al. | 106/22 H |
| 5,158,606 | 10/1992 | Carlick et al. | 524/145 |
| 5,288,316 | 2/1994 | Auslauder et al. | 106/27 R |
| 5,389,130 | 2/1995 | Batlaw et al. | 106/20 R |
| 5,575,839 | 11/1996 | Okuda | 106/20 C |
| 5,667,570 | 9/1997 | Okuda | 106/31.26 |

FOREIGN PATENT DOCUMENTS

| 1454899 | 11/1976 | United Kingdom . |
|---|---|---|
| PCTUS92/01199 | 2/1992 | WIPO . |

*Primary Examiner*—Marion McCamish
*Assistant Examiner*—John J. Guarriello
*Attorney, Agent, or Firm*—Fay, Sharpe, Beall, Fagan, Minnich & McKee

[57] ABSTRACT

An emulsion ink for stencil printing is disclosed which enlarges the selection region of a body to be printed on, improves the handling property and adds a building-up feeling and a brilliance to the printed letters and others by developing the drying property, sticking tendency and preservation stability of the ink. The emulsion ink for stencil printing is characterized by using an oil-in-water type resin emulsion as a water phase in the water-in-oil type emulsion ink consisting of an oil phase and a water phase, and it is further characterized in that the minimum film-making temperature for the oil-in-water type resin emulsion described above is 40° C. or less and its compound ratio is 2–45 wt.% as a reduced solid basis of the total amount of the avaiable emulsion ink.

8 Claims, No Drawings

EMULSION INKS FOR STENCIL PRINTING

This is a continuation of U.S. application Ser. No. 08/651,125 filed May 21, 1996, abandoned, which is a continuation of U.S. application Ser. No. 08/188,061 filed Jan. 26, 1994, abandoned.

BACKGROUND OF THE INVENTION

1. Field of the Invention

The present invention relates to an emulsion ink for stencil printing. Specifically, it relates to an emulsion ink for stencil printing excellent in its drying property, sticking tendency and preservation stability and suitable for adding its building-up feeling and brilliance to the printed letters and others.

2. Description of the Prior Art

A stencil printing method has been utilized in a very extensive range of fields because of the easiness in preparing a stencil sheet. The process for drying the ink in stencil printing is normally proceeded by the permeation of an ink emulsion into a printing paper and the evaporation of the moisture contained in the ink emulsion. Therefore, it has been impossible to completely stick the ink to a printing paper since the drying process proceeds only by the evaporation of the moisture from the ink emulsion on the printing body such as a high quality paper, i.e., a coated paper which has no permeability at all, or a film.

On the other hand, in the case that a permeative material is used as a body to be printed on, the ink permeates into the inside of the body to be printed on. As a result, it is very hard to give the building-up feeling and brilliance to the printed letters and others. Further, and there is a disadvantage in that the resulting set-off is easily caused at the time of continuous printing due to the delay in its permeation velocity.

As a method for improving the drying property of the stencil printing ink, there is known a method which uses an oil-in-water type emulsion ink, the oil phase of which includes a resin component of a polymer type such as an oxidation polymerization product. It was impossible, however, to leave it for many hours due to the generation of plugging-up of the ink in the stencil sheet and the resulting handling became very troublesome due to the inferior preservation stability of the emulsion ink.

SUMMARY OF THE INVENTION

It is accordingly a primary object of this invention to solve the problems of the prior art described above, enlarge the selection region of the body to be printed on by improving the drying property, sticking tendency and the preservation stability in respect of the printing ink, attain the improvement in the handling property thereof, and to provide an emulsion ink which can add its building-up feeling and brilliance to the printed letters and others.

The first aspect of the invention resides in an emulsion ink for stencil printing, wherein the emulsion ink is of a water-in-oil type consisting of an oil phase and a water phase.

Another aspect of the invention resides in as emulsion ink or stencil printing described above, wherein the minimum film-formation temperature for the oil-in-water type resin emulsion is 40° C. or less and its content is 2–45 % by weight as a reduced solid basis of the total amount of the emulsion ink.

Minimum film formation temperature (M.F.T.) can be measured by a conventional method defined in JIS K 6828. M.F.T. means the lowest temperature at which an emulsion can be made to a film, when an emulsion is dried.

The emulsion ink for stencil printing of the present invention is an emulsion ink of a water-in-oil (which will be designated as a W/O thereafter) type. For Example, the emulsion ink described above can be produced with the gradual addition of a 90–30 wt. % water phase (W) component containing as oil-in-water (which will be designated as an O/W thereafter) type resin emulsion to a 10–70 wt. % oil phase (O) component containing a solvent, resin, coloring agent, emulsifying agent, etc. A water-soluble additive such as a wetting agent, water-soluble resin, electrolyte, fungicide or antioxidant, can be contained in the water phase described above if necessary.

In the present invention, an o/w type resin emulsion is used as a water phase (W) component. The ratio thereof is in the range of 2–45 wt. %, preferably 10–30 wt. % as a reduced solid basis of the total amount of the emulsion ink. In the case that the ratio of an o/w type emulsion is less than 2 wt. %, there is less effect to the drying property and sticking tendency of the ink. When it exceeds 45 wt. %, the preservation stability is lowered. The minimum film-making temperature (which will be abbreviated as a M.F. T. thereafter) of the o/w type resin emulsion may be 40° C. or less, preferably less than the temperature range suitable for the actual operation of printing machines, and more preferably 10° C. or less, from the standpoint of the film-formation ability after the ink is dried. In the case of using water as a dispersing agent, the minimum value of M.F. T. is as low as 0° C. In order to reduce the value of M.F. T., some film-making additives for emulsion, e.g., glycol type compound (i.e., ethylene glycol monobutyl ether) and ester type compound (i.e., phthalate type plasticizer) can properly be used.

In the W/O type emulsion ink of the present invention, its stability varies depending on the pH value of the o/w type resin emulsion and breaking or phase inversion of the W/O type emulsion is often occurred. Therefore, in the strongly acidic range (pH 1–3) and strong alkaline range pH 11–14), it is preferable to adjust the pH value of the emulsion described above, if necessary, while paying attention so that the o/w type resin emulsion, itself, may not be broken.

As for a resin to be used in the o/w type resin emulsion, some compounds will be listed as follows: polyvinyl acetate, ethylene-vinyl acetate copolymer, vinyl acetate-acrylic ester copolymer, polyacrylate, polymethacrylate, styrene-acrylic ester copolymer, vinylidene chloride-acrylic ester copolymer, polyvinyl chloride, vinyl chloride-vinyl acetate copolymer, polyurethane and others. The o/w type resin emulsion can be prepared by e.g., solution emulsification method, fusion emulsification method. As a commercial product, for example, a synthetic emulsion of acrylic ester-styrene copolymer, i.e., Polysol AP-3510 (Showa Polymer Co. product), a coating emulsion of acrylic resin, No.3985 (Dainihon Ink Chemical Co. product and others can be used.

A wetting agent is added to the water phase (W), if necessary. This wetting agent has an action for preventing the plugging-up of the stencil sheet due to vaporization of the moisture in the ink. However, if this is added to the emulsion ink too much, the resulting drying property becomes bad in the printed ink portion after the printing. Therefore, its content is properly determined depending on the film-making ability of the o/w type resin emulsion, and it is preferable to use at least as low as 2% by weight of the total amount of the ink. As a wetting agent, polyhydric alcohols such as ethylene glycol, propylene glycol, diethylene glycol, glycerine are exemplified.

As an oil phase (O) component, for example, some petroleum type compounds will be exemplified as follows:

Ink Solvent 240 (boiling point: 242°–260° C., Mitsubishi Petroleum Co. product), Nisseki Isosol 400 (boiling point: 206°–257° C., Nihon Petroleum Co. product), Nisseki No.4 Solvent (boiling point: 206°–267° C., Nihon Petroleum Co. product) and others.

As a resin to be contained in the oil phase (O) component, there is no particular limitation so long as the resin has its compatibility and homogeneous dispersibility with coloring agents and the other oil phase components and also its compatibility with the resin component contained in the o/w type resin emulsion described above. For example, a phenol resin, maleic resin, petroleum resin or alkyd resin may be used. Incidentally, the sticking of the ink to a body to be printed on in the case of the present invention is mostly carried out by the resin component contained in the o/w type resin emulsion.

As a coloring agent contained in the oil phase (O) component, there is known compounds to be used as follows: e.g., furnace carbon black, lamp black, brilliant first scarlet.

As an emulsifying agent for the preparation of the W/O type emulsion, nonionic surfactants are preferred. For example, Sorbitan higher fatty acid ester (Sorbitan monolaurate, Sorbitan monopalmitate, etc.), fatty acid monoglyceride (oleic acid monoglyceride, oleic acid diglyceride, etc.), polyhydric alcohol, and ethylene oxide adduct with fatty acid, are used. In order to obtain a stable W/O type emulsion ink, it is preferable to select a proper emulsifying agent taking into a consideration of the kinds of the surfactants and others used in the o/w type resin emulsion.

In the W/O type emulsion ink (which will often be designated as a (o/w)/O type resin emulsion thereafter) of the present invention, the water phase (W) component contains an o/w type resin emulsion, and the resin component in the o/w type resin emulsion forms a film on the surface of a body to be printed on by the moisture evaporation from the ink printed on to dry the ink. Thus, the drying property and sticking tendency of printed letters, etc., are both improved and the resulting building-up feeling of the ink is obtained. If a certain kind of resin is used in order to add a brilliance as the above resin component after the film is formed, it is possible to afford a brilliance to the printed letters, etc. Furthermore, since the W/O type emulsion ink of the present invention is different from the one using a polymerization type resin as an oil phase component resin in that the resulting ink surface is-hardly hardened while it is left for a long period of time and as a result, it is possible to obtain an emulsion ink having a high preservation stability.

DETAILED DESCRIPTION OF THE PREFERRED EMBODIMENTS

Now, the present invention will be described in details with reference to Examples. It is to be understood, however, that the present invention should not be limited the sets. Incidentally, the "Parts" in each example will be shown as "Parts by Weight".

Table 1 shows the physical properties of the o/w type resin emulsion used in the following examples and comparative examples. The preservation stability of the emulsion thus obtained, the easiness in preparing the W/O type emulsion, the drying property and sticking tendency thereof, and the building-up feeling and brilliance of the letters in the printed matters, were evaluated by the following methods.

(1) Preservation stability:

A prepared emulsion ink was left at room temperature for a month and the stability of the emulsion was examined by visual observation. Then, the evaluation thereof was done as follows:

○: the resulting ink surface is not hardened.

X: the resulting ink surface is hardened.

(2) Easiness in preparing the W/O type emulsion:

Whether a stable (o/w)/O type emulsion was formed or not was examined by the breaking of the emulsion immediately after the ink preparation. Then, the evaluation thereof was done as follows:

○:there is no breaking of the (o/w)/O type emulsion.

X: the resulting emulsion is broken.

(3) Drying property:

The hardening condition of the ink inversion surface was examined by a finger touch test one minute later after printing, and then, the evaluation was done as follows:

○: no ink is touched with the finger at all.

Δ: the hardened condition is the intermediate condition from ○ to X.

X: the ink is sticked to the finger.

(4) Sticking tendency:

The sticking condition of the ink to the printing paper was examined by a finger touch test five minutes later after printing, and then, the evaluation was done as follows:

○: the sticking tendency of the ink to the paper is good.

Δ: the sticking condition is the intermediate condition from ○ to X.

X: the sticking tendency of the ink to the paper is bad.

(5) Building-up feeling:

The thickness of the portion attached with the printed ink was examined by a finger touch test after drying, and then, the evaluation was done as follows:

○: there is a building-up feeling.

Δ: the building-up condition is the intermediate condition from ○ to X.

X : there is no building-up feeling.

(6) Brilliance:

The brilliant condition of the portion attached with the printed ink was examined by visual observation, and then, the evaluation was done as follows:

○: the glossy condition of the attached ink surface is good.

X: there is no brilliance at all.

EXAMPLE 1.

| | | |
|---|---|---|
| Rosin modified phenol resin (resin) | 6.2 | Parts- A |
| Furnace carbon black (coloring agent) | 3.0 | Parts \| |
| Ink Solvent 240 (solvent) | 14.8 | Parts \| |
| Sorbitan monooleate (emulsifying agent) | 3.0 | Parts-' |
| Water | 5.0 | Parts- B |
| Ethylene glycol (wetting agent) | 3.0 | Parts-' |
| Acrylic ester o/w type resin emulsion | 65.0 | Parts- C |
| | 100.0 | Parts |

Rosin modified phenol resin, furnace carbon black, Sorbitan monooleate and Ink Solvent 240 (components A) were mixed with stirring at the above mixing ratio, sufficiently kneaded by three rollers, stirred by a stirrer while gradually adding an aqueous component B consisting of water and ethylene glycol, and emulsified. The resulting solution was stirred by the stirrer while gradually adding component C of acrylic ester o/w type resin emulsion, and emulsified, resulting in preparing the W/O type emulsion ink of the present invention. By use of the emulsion ink thus obtained, a stencil master printing was carried out by means of a stencil printing machine (Riso Kagaku Corporation product, Trademark Risograph RC115D) to evaluate the ink characteristics and others. The results thus obtained are shown in Table 2.

EXAMPLE 2.

| | |
|---|---|
| Alkyd resin (resin) | 5.8 Parts- A |
| Brilliant first scarlet (coloring agent) | 3.0 Parts | |
| Ink Solvent 240 (solvent) | 10.2 Parts | |
| Sorbitan sesquioleate (emulsifying agent) | 3.0 Parts-' |
| Water | 14.0 Parts- B |
| Ethylene glycol (wetting agent) | 3.0 Parts-| |
| Sodium sulfate (electrolyte) | 1.0 Parts-| |
| Carboxymethyl cellulose (water-soluble resin) | 3.0 Parts-' |
| Vinyl acetate-acrylic ester copolymer o/w type resin emulsion | 57.0 Parts- C |
| | 100.0 Parts |

At the above component ratio, a W/O type emulsion ink of the present invention was prepared in the same manner as described in Example 1. By use of the emulsion ink thus obtained, a stencil master printing was carried out to evaluate the ink characteristics and others. The results thus obtained are shown in Table 2.

EXAMPLE 3.

| | |
|---|---|
| Alkyd resin (resin) | 7.8 Parts- A |
| Furnace carbon black (coloring agent) | 3.0 Parts | |
| Nisseki Isosol 400 (solvent) | 12.2 Parts | |
| Sorbitan sesquioleate (emulsifying agent) | 3.0 Parts-' |
| Water | 10.0 Parts- B |
| Ethylene glycol (wetting agent) | 3.0 Parts-| |
| Sodium sulfate (electrolyte) | 1.0 Parts-| |
| Carboxymethyl cellulose (water-soluble resin) | 3.0 Parts-' |
| Acrylic ester-styrene copolymer o/w type brightening resin emulsion | 57.0 Parts- C |
| | 100.0 Parts |

At the above component ratio, a W/O type emulsion ink of the present invention was prepared in the same manner as described in Example 1. By use of the emulsion ink thus obtained, a stencil master printing was carried out to evaluate the ink characteristics and others. The results thus obtained are shown in Table 2.

EXAMPLE 4.

| | |
|---|---|
| Rosin modified phenol resin (resin) | 9.0 Parts- A |
| Furnace carbon black (coloring agent) | 3.0 Parts | |
| Nisseki Isosol 400 (solvent) | 10.0 Parts | |
| Sorbitan monooleate (emulsifying agent) | 3.0 Parts-' |
| Water | 14.0 Parts- B |
| Ethylene glycol (wetting agent) | 3.0 Parts-' |
| Ethylene-vinyl acetate copolymer o/w type resin emulsion | 58.0 Parts- C |
| | 100.0 Parts |

At the above component ratio, a W/O type emulsion ink of the present invention was prepared in the same manner as described in Example 1. By use of the emulsion ink thus obtained, a stencil printing was carried out to evaluate the ink characteristics and others. The results thus obtained are shown in Table 2.

EXAMPLE 5.

A W/O type emulsion ink of the present invention was prepared in the same manner as described in Example 4, with the exception of adding a glycol type plasticizer as follows to ethylene-vinyl acetate copolymer o/w type resin emulsion in Example 4 as a film-making additive for emulsion. By use of the emulsion ink thus obtained, a stencil master printing is carried out to evaluate the ink characteristics and others. The results thus obtained are shown in Table 2.

| | |
|---|---|
| Ethylene-vinyl acetate copolymer o/w type resin emulsion (50 wt. % solution) | 57.0 Parts-' C |
| Ethylene glycol monobutyl ether | 1.0 Part -' | |
| | 58.0 Parts |

Comparative example 1.

| | |
|---|---|
| Rosin modified phenol resin (resin) | 6.2 Parts- A |
| Furnace carbon black (coloring agent) | 3.0 Parts | |
| Ink Solvent 240 (solvent) | 14.8 Parts | |
| Sorbitan monooleate (emulsifying agent) | 3.0 Parts- |
| Water | 70.0 Parts- B |
| Ethylene glycol (wetting agent) | 3.0 Parts- | |
| | 100.0 Parts |

At the above component ratio, a prior art W/O type emulsion ink not using the o/w type resin emulsion was prepared in the same method as described in Example 1. By use of the emulsion ink thus obtained, a stencil master printing was carried out to examine the ink characteristics and others. The results thus obtained are shown in Table 2.

Comparative example 2.

| | |
|---|---|
| Alkyd resin (resin) | 5.8 Parts- A |
| Brilliant first scarlet (coloring agent) | 3.0 Parts | |
| Ink Solvent 240 (solvent) | 10.2 Parts | |
| Sorbitan sesquioleate (emulsifying agent) | 3.0 Parts- |
| Water | 14.0 Parts- B |
| Ethylene glycol (wetting agent) | 3.0 Parts- | |
| Sodium sulfate (electrolyte) | 1.0 Parts- | |
| Carboxymethylcellulose (water-soluble resin) | 3.0 Parts- | |
| Acrylic ester o/w type resin emulsion | 57.0 Parts-C |
| | 100.0 Parts |

At the above compound ratio, a W/O type emulsion ink was prepared in the same manner as described in Example 1 except that an o/w type resin emulsion having the minimum film-making temperature of 55° C. was used. By use of the emulsion ink thus obtained, a stencil master printing was carried out to examine the ink characteristics and others. The results thus obtained are shown in Table 2.

Comparative example 3.

| | |
|---|---|
| Rosin modified phenol resin (resin) | 9.0 Parts- A |
| Furnace carbon black (coloring agent) | 3.0 Parts | |
| Nisseki Isosol 400 (solvent) | 10.0 Parts | |
| Sorbitan monooleate (emulsifying agent) | 3.0 Parts-' |
| Water | 14.0 Parts- B |

-continued

| Ethylene glycol (wetting agent) | 3.0 Parts-' |
| Acrylic ester-styrene copolymer o/w type brightening resin emulsion | 58.0 Parts- C |
| | 100.0 Parts |

At the above component ratio, a W/O type emulsion ink was used prepared in the same manner as described in Example 1 except that a strongly acidic o/w type resin emulsion (pH 1.5–3.0) was used. By use of the emulsion ink thus obtained, a stencil master printing was carried out to examine the ink characteristics and others. The results thus obtained are shown in Table 2. Comparative example 4.

| Rosin modified phenol resin (resin) | 9.0 Parts- A |
| Furnace carbon black (coloring agent) | 3.0 Parts |
| Nisseki Isosol 400 (solvent) | 10.0 Parts |
| Sorbitan monooleate (emulsifying agent) | 3.0 Parts-' |
| Water | 3.0 Parts- B |
| Ethylene-vinyl acetate copolymer o/w type resin emulsion | 72.0 Parts- C |
| | 100.0 Parts |

At the above component ratio, a W/O type emulsion ink was prepared in the same manner as described in Example 1 except that a relatively large amount of an o/w type resin emulsion was used. By use of the emulsion ink thus obtained, a stencil printing was carried out to examine the ink characteristics and others. The results thus obtained are shown in Table 2.

According to the emulsion ink for a stencil master printing of the present invention, since the water phase component contains an o/w type resin emulsion, it is possible to improve the drying property and sticking tendency of the ink. Since the resin component in the o/w type emulsion ink is sticked to the surface of a body to be printed on, it is possible to afford a building-up feeling to the ink letters and others, and in the case of using a resin giving a brilliance as a resin component used for the o/w type resin emulsion after film formation, it is possible to give a desirable brilliance to the ink surface after sticking. Furthermore, since no polymerization type resin was used as a resin of the oil phase component, the preservation stability of the emulsion ink is also improved.

TABLE 1

|  | Amount of resin | Viscosity*2 (cps) | pH | M.F.T. *3 (°C.) | Particle diameter ($\mu$) |
| --- | --- | --- | --- | --- | --- |
| Example 1 | 30*1 | 300–2000 | 7.7–8.3 | 20–25 | 0.1 or less |
| Example 2 | 41 | 100 or less | 7.0–9.0 | 12 | 0.1 |
| Example 3 | 50 | 200–700 | 8.0–10.0 | 27 | 0.2 |
| Example 4 | 55 | 1200 | 7.0 | 35 | 0.1 |
| Example 5 | 55 | 1200 | 7.0 | 35 | 0.1 |
| Comparative example 1 | — | — | — | — | — |
| Comparative example 2 | 30 | 100–2000 | 6.0–9.0 | 55 | 0.1 |
| Comparative example 3 | 50 | 10–30 | 1.5–3.0 | 34 | 0.15–0.25 |
| Comparative example 4 | 63 | 2500 | 7.0 | 0 | 0.1 |

*1. Unit: by wt. %
*2. Viscosity was measured by a B-type viscometer (30 rpm and CPS/25° C.).
*3. Minimum Film Formation Temperature: According to JIS K 6828.

TABLE 2

|  | Preservation stability | (o/w)/O | Drying property | Sticking tendency | Building up feeling | Brilliance |
| --- | --- | --- | --- | --- | --- | --- |
| Example 1 | ○ | ○ | ○ | ○ | ○ | X |
| Example 2 | ○ | ○ | ○ | ○ | ○ | X |
| Example 3 | ○ | ○ | ○ | ○ | ○ | ○ |
| Example 4 | ○ | ○ | ○ | ○ | ○ | X |
| Example 5 | ○ | ○ | ○ | ○ | ○ | X |
| Comparative example 1 | ○ | — | X | X | X | X |
| Comparative example 2 | ○ | ○ | Δ | Δ | Δ | X |
| Comparative example 3 | X | X | — | — | — | — |
| Comparative example 4 | X | ○ | ○ | ○ | ○ | X |

What is claimed is:

1. An emulsion ink for stencil printing, wherein the emulsion ink is of a water-in-oil composition comprising a 10–70% by weight oil phase component and a 90–30% by weight water phase component, said water phase further comprising an oil-in-water resin emulsion, said oil-in-water resin emulsion having a minimum film-making temperature of 40° C. or less.

2. An emulsion ink for stencil printing according to claim 1, wherein said oil-in-water resin emulsion contains one or more resins selected from a group consisting of polyvinyl acetate, ethylene-vinyl acetate copolymer, vinyl acetate-acrylic ester copolymer, polyacrylate, polymethacrylate, styrene-acrylic ester copolymer, vinylidene chloride-acrylic ester copolymer, polyvinyl chloride, vinyl chloride-vinyl acetate copolymer, and polyurethane.

3. An emulsion ink for stencil printing according to claim 1, wherein the content of said oil-in-water type resin emulsion is in a range of 2–45% by weight as a reduced solid basis of a total amount of available emulsion ink.

4. An emulsion ink for stencil printing according to claim 3, wherein a content of said oil-in-water resin emulsion is in a range of 10–30% by weight as a reduced solid basis of a total amount of available emulsion ink.

5. A water-in-oil emulsion ink for stencil printing, said ink comprising:

a first composition including about 5.8 to 9.0 parts by weight of a resin, about 3.0 parts by weight of a coloring agent, about 10.0 to 14.8 parts by weight of an ink solvent, and about 3.0 parts weight of an emulsifying agent;

a second composition including about 5.0 to about 14.0 parts by weight of water; and a third composition including about 57.0 to 65.0 parts by weight of an oil-in-water emulsion; wherein said oil-in-water emulsion has a minimum film forming temperature of about 40° C. or less.

6. The water-in-oil emulsion ink for stencil printing according to claim 5 wherein said second composition further includes about 1.0 parts by weight of an electrolyte, and about 3.0 parts by weight of a water soluble resin.

7. An ink particularly adapted for stencil printing, said ink comprising:

a water-in-oil emulsion including an oil phase having a range of 10–70 wt. % and a water phase having a range of 90–30 wt. %; and said water phase further including an oil-in-water resin emulsion of 2–45 wt. % as a reduced solid basis of a total amount of the ink, said oil-in-water resin emulsion having a minimum film forming temperature of about 40° C. or less.

8. An ink according to claim 7 wherein the oil-in-water resin emulsion is 10–30 wt. %.

* * * * *